(12) United States Patent
Yiannacouras et al.

(10) Patent No.: US 9,922,150 B1
(45) Date of Patent: Mar. 20, 2018

(54) METHOD AND APPARATUS FOR SATISFYING OPERATING CONDITIONS IN A SYSTEM DESIGN USING AN ELECTRONIC DESIGN AUTOMATION TOOL

(71) Applicant: Altera Corporation, San Jose, CA (US)

(72) Inventors: Peter Yiannacouras, Etobicoke (CA); John Stuart Freeman, Toronto (CA); Deshanand Singh, Mississauga (CA)

(73) Assignee: Altera Corporation, San Jose, CA (US)

( * ) Notice: Subject to any disclaimer, the term of this patent is extended or adjusted under 35 U.S.C. 154(b) by 418 days.

(21) Appl. No.: 14/538,666

(22) Filed: Nov. 11, 2014

(51) Int. Cl.
G06F 9/455 (2006.01)
G06F 17/50 (2006.01)

(52) U.S. Cl.
CPC ............... G06F 17/5045 (2013.01)

(58) Field of Classification Search
CPC . G06F 17/505; G06F 17/5045; G06F 2217/62
See application file for complete search history.

(56) References Cited

U.S. PATENT DOCUMENTS

| | | | | |
|---|---|---|---|---|
| 9,183,337 B1* | 11/2015 | Nagpal | ................... | G06F 17/50 |
| 9,218,443 B1* | 12/2015 | Styles | ................... | G06F 17/505 |
| 2002/0133788 A1* | 9/2002 | Waters | ....................... | G06F 8/44 |
| | | | | 716/103 |
| 2004/0267972 A1* | 12/2004 | Ou | ........................ | G06F 13/385 |
| | | | | 710/8 |
| 2013/0097568 A1* | 4/2013 | Yang | ................... | G06F 17/5022 |
| | | | | 716/113 |
| 2015/0347654 A1* | 12/2015 | Han | ..................... | G06F 17/5045 |
| | | | | 716/102 |
| 2016/0110486 A1* | 4/2016 | Kheterpal | ............. | G06F 17/505 |
| | | | | 716/101 |
| 2016/0132441 A1* | 5/2016 | Styles | .................... | G06F 13/28 |
| | | | | 710/110 |

* cited by examiner

*Primary Examiner* — Nha Nguyen
(74) *Attorney, Agent, or Firm* — Compass IP Law PC (57) ABSTRACT

A method for designing a system on a target device includes describing the system in a high-level synthesis language where the system includes a configurable clock to drive the system at a specified clock frequency. A hardware description language (HDL) of the system is generated from the high-level synthesis language. An initial compilation of the HDL of the system is performed in response to the specified clock frequency. Timing analysis is performed on the system after the initial compilation of the HDL to determine a maximum frequency which the system can be driven. The configurable clock is programmed to drive the system at the maximum frequency.

21 Claims, 10 Drawing Sheets

METHOD AND APPARATUS FOR SATISFYING OPERATING CONDITIONS IN A SYSTEM DESIGN USING AN ELECTRONIC DESIGN AUTOMATION TOOL

FIELD

Embodiments of the present invention relate to tools for designing systems on target devices. More specifically, embodiments of the present invention relate to a method and apparatus for satisfying operating conditions in a system design using an electronic design automation tool.

BACKGROUND

Target devices such as field programmable gate arrays (FPGAs), application specific integrated circuits (ASICs), and structured ASICs are used to implement large systems that may include million of gates and megabits of embedded memory. The complexity of a large system often requires the use of electronic design automation (EDA) tools to create and optimize a design for the system onto physical target devices.

Among the procedures performed by EDA tools in a computer aided design (CAD) compilation flow are high-level compilation and hardware description language (HDL) compilation. EDA tools that perform high-level compilation allow designers to more quickly realize designs for systems by raising the abstraction level from traditional register transfer level (RTL) based design. However, certain aspects of system design are inescapable and continue to provide challenges for designers. On such aspect is timing closure where all clocks must meet their respective fixed timing constraints.

Traditionally, when timing closure is not met after an initial high-level compilation and HDL compilation run, additional iterations of the design process are needed to modify the hardware design and further analyze the timing of the design. This may require a significant amount of time which can be undesirable.

SUMMARY

According to embodiments of the present invention, a method and apparatus for satisfying operating conditions in a system design using an electronic design automation tool is disclosed. Clocks having hard constraints and that are associated with interface logic are pre-timed closed while clocks that are associated with compiler generated logic are analyzed and adjusted to allow the system to remain functional.

According to an embodiment of the present invention, a method for designing a system on a target device includes describing the system in a high-level synthesis language where the system includes a configurable clock to drive the system at a specified clock frequency. Hardware description language (HDL) of the system is generated from the high-level synthesis language. Initial compilation of the HDL of the system is performed in response to the specified clock frequency. Timing analysis on the system is performed after the initial compilation of the HDL to determine a maximum frequency which the system can be driven. The configurable clock is programmed to drive the system at the maximum frequency.

According to an embodiment of the present invention, a method for programming a configurable clock on a target device includes identifying kernels to be driven by the configurable clock. Timing analysis is performed to determine a maximum frequency for which each of the identified kernels can be driven. Which of the identified kernels are active on the target device at an instant of time are identified. The configurable clock is programmed to operate at a clock frequency that is a lowest maximum frequency of the active kernels.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

Figure 1:
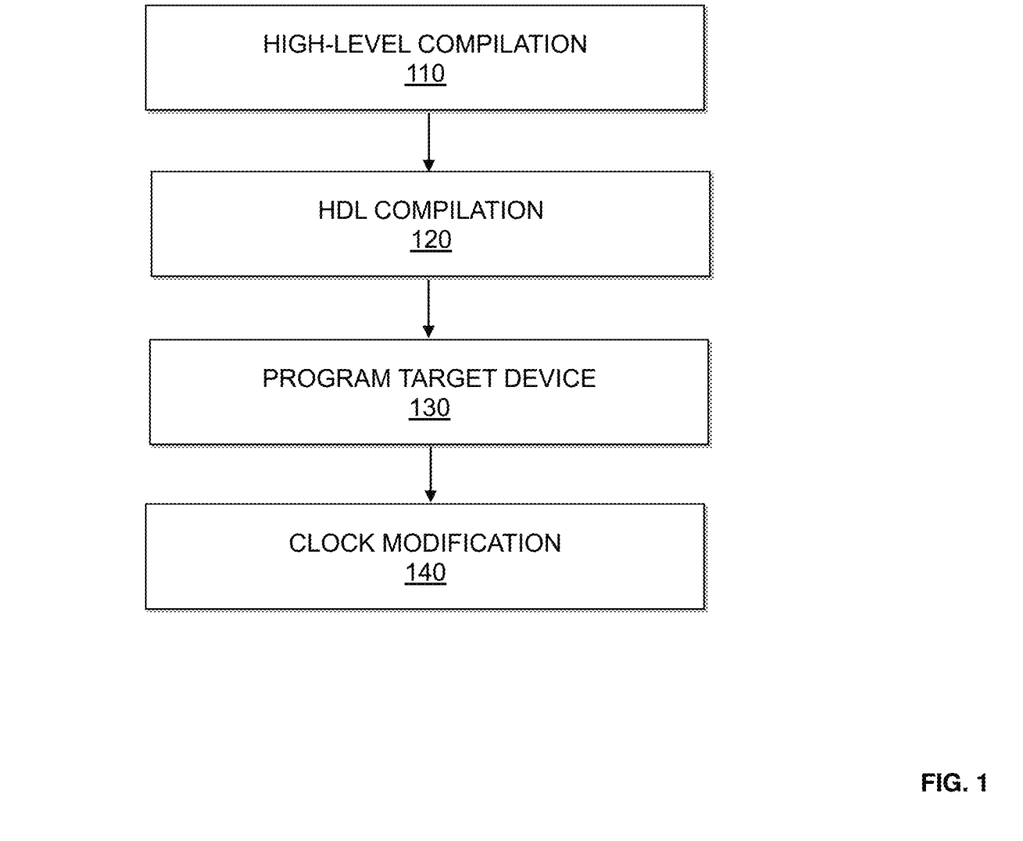
FIG. 1 is a flow chart illustrating a method for designing a system on a target device according to an exemplary embodiment of the present invention.

FIG. 1 is a flow chart illustrating a method for designing a system on a target device according to an exemplary embodiment of the present invention. The target device may be a field programmable gate array (FPGA), application specific integrated circuit (ASIC), a structured ASIC, or other device whose functionality is described by a hardware description language (HDL). According to one embodiment, the procedure illustrated in FIG. 1 may be performed by one or more computer aided design (CAD)/electronic design automation (EDA) tools implemented on a computer system.

At 110, high-level compilation (or "high-level synthesis") of a design for a system is performed. High-level compilation involves generating a HDL of the system from a computer language description of the system. The HDL of the system may integrate information regarding other components or hosts that may be pre-designed. According to an embodiment of the present invention, the HDL of the system includes one or more configurable clocks that may have its operating frequency programmed during HDL compilation or after the system is programmed on the target device. The configurable clock may be inserted into the computer language description of the system by a designer, in response to requirements in the information regarding other components or hosts, or automatically in response to identifying a need for a clock.

At 120, HDL compilation is performed. HDL compilation involves performing synthesis, placement, routing, and timing analysis on the HDL and generating a program file. According to an embodiment of the present invention, the maximum frequencies of sections of the system are identified from timing analysis, and configurable clocks associated with the sections of the system may be programmed in response to the maximum frequencies during HDL compilation.

At 130, the target device is programmed using the program file to implement the system. According to an embodiment of the present invention, the program file may be generated and transmitted to another computer system that may be used to program the target device according to the system design. By programming the target with the program file, components on the target device are physically transformed to implement the system.

At 140, one or more configurable clocks are modified. According to an embodiment of the present invention, the maximum frequencies of sections of the design for the system are identified from timing analysis and configurable clocks associated with the sections of the design are programmed in response to the maximum frequencies after the target device has been programmed. According to an embodiment of the present invention, programming the configurable clocks may be achieved by using a control/host processor connected to the target device or a state machine residing on the target device.

Figure 2:
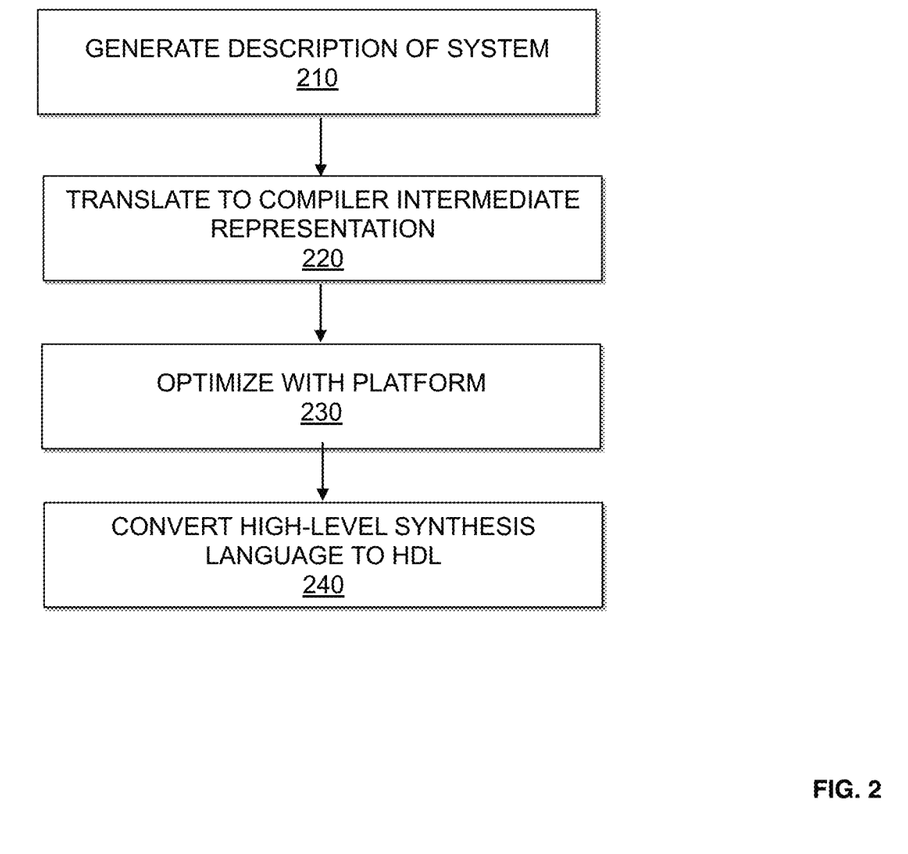
FIG. 2 is a flow chart illustrating a method for performing high-level compilation according to an embodiment of the present invention.

FIG. 2 is a flow chart illustrating a method for performing high-level compilation according to an embodiment of the present invention. According to an embodiment of the present invention, the procedures shown in FIG. 2 may be used to implement procedure 110 in part (shown in FIG. 1). At 210, a description of a system is generated from a computer language description. The computer language description of the system may be, for example, in Open Computing Language (OpenCL) format or another computer language description format that provides a framework for writing programs that execute across heterogeneous platforms. The computer language description format may be used for writing kernels and application programming interfaces (APIs) that are used to define and control platforms. According to an embodiment of the present invention, the description of the system is generated by a user using a graphical interface, and the description of the system may be referred to as kernel code.

At 220, the kernel code is translated to compiler intermediate representation. According to an embodiment of the present invention, the compiler intermediate representation of the kernel code includes a sequence of functions and a named data storage. Each function is a sequence of instructions grouped into basic blocks. A basic block is a contiguous sequence of instructions with one entry point and one exit point. An instruction in the middle of a basic block may be a function call, but may not count as an exit point from the basic block. Each basic block terminates with either (1) branch (possibly conditional), or (2) a return from the function. The kernel code may also include a system description of the hardware target system which it is to be implemented on.

At 230, the compiler intermediate representation is transformed and optimized by mapping it to hardware constructs. According to an embodiment of the present invention, information regarding other components or hosts that interface with the system is used to transform and optimize the compiler intermediate representation of the system. For example, pre-compiled logic ("IP") for components or hosts that interface with the system may specify that a configurable clock be used to drive specified logic in the system described by the kernel code. It should be appreciated that the information may define one or more clock domains for one or more sections in the system that are driven by one or more configurable clocks. Furthermore, the information may also define more than one configurable clock for a specified section in the system to allow for circuit optimizations and enhanced performance. A configurable clock may also be implemented during 230 in response to the computer language description (user source code). Alternatively, the configurable clock may be implemented during 230 automatically whenever it is determined that a clock is required for the system.

At 240, HDL is generated for the design of the system. The HDL describes the operation of the system to be programmed on the target device. The HDL description provides high-level representations of a circuit in terms of the flow of signals (or transfer of data) between hardware registers, and the logic operations performed on those signals.

Figure 3:
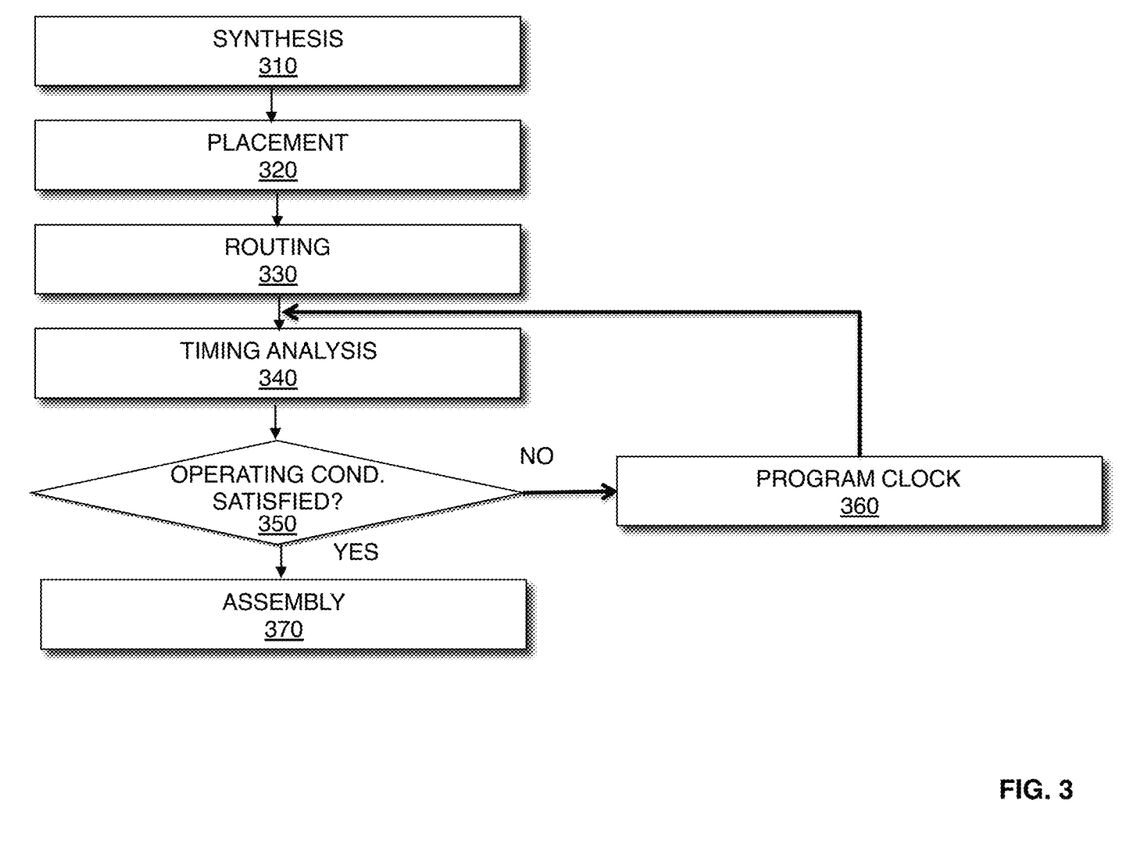
FIG. 3 is a flow chart illustrating a method for performing hardware description language compilation according to an embodiment of the present invention.

FIG. 3 is a flow chart illustrating a method for performing HDL compilation according to an embodiment of the present invention. According to an embodiment of the present invention, the procedures illustrated in FIG. 3 may be used to implement procedure 120 (shown in FIG. 1). At 310, the system is synthesized. Synthesis includes generating a logic design of the system to be implemented by the target device. According to an embodiment of the present invention, synthesis generates an optimized logical representation of the system from an HDL design definition. Synthesis also includes mapping the optimized logic design. Mapping includes determining how to implement logic gates and logic elements in the optimized logic representation with specific resources on the target device. According to an embodiment of the present invention, a netlist is generated from mapping. This netlist may be an optimized technology-mapped netlist generated from the HDL.

At 320, the system is placed. According to an embodiment of the present invention, placement involves placing the mapped logical system design on the target device. Placement works on the technology-mapped netlist to produce a placement for each of the functional blocks. According to an embodiment of the present invention, placement includes fitting the system on the target device by determining which resources on the logic device are to be used for specific logic elements, and other function blocks, determined to implement the system during synthesis. Placement may include clustering which involves grouping logic elements together to form the logic clusters present on the target device. According to an embodiment of the present invention, clustering is performed at an early stage of placement and occurs directly after synthesis during the placement preparation stage.

At 330, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

According to an embodiment of the present invention, each of the configurable clocks defined in the HDL of the design of the system has a specified clock frequency. The specified clock frequency may operate as a soft target for the compilation performed at synthesis 310, placement 320, and routing 330.

At 340, timing analysis is performed on the system designed by procedures 310, 320, and 330. According to an embodiment of the present invention, the timing analysis determines whether timing constraints of the system are satisfied. The timing analysis also determines the maximum frequency that a clock may drive sections of the system originating from the kernel code ("kernel logic").

At 350, it is determined whether operating conditions are satisfied. According to an embodiment of the present invention, operating conditions are satisfied when a configurable clock is driving each of its associated sections of the system ("clocking domain") at the section's maximum frequency. If it is determined that operating conditions are not satisfied, control proceeds to 360. If it is determined that operating conditions are satisfied, control proceeds to 370. According to an embodiment of the present invention, when a configurable clock drives a plurality of clocking domains each having a different maximum frequency, operating conditions may be considered to be satisfied when the configurable clock is driving at the maximum frequency of the clocking domain having the lowest maximum frequency.

At 360, one or more configurable clocks associated with one or more clocking domains not satisfying at operating conditions are programmed to meet maximum frequency requirements. According to an embodiment of the present invention, this may be achieved by modifying configuration bits directly when information regarding the configuration bitstream is provided to the user. Alternatively, programming the configurable clock may be achieved by changing atom parameters by using application program interface provided by an EDA tool. It should be appreciated that programming the configurable clock may also be achieved by recompiling the entire design for the system by having control return to synthesis 310, placement 320, and routing 330, before returning to timing analysis 340.

According to an embodiment of the present invention, the synthesis 310, placement 320, routing 330, timing analysis 340, operating condition checking 350, and clock programming 360 procedures may be performed on HDL for kernel code originating from a description of a system generated from a computer language description. It should be appreciated that pre-compiled logic may also be implemented for portions of the system that is compiled. The pre-compiled logic may be in the form of a post-fit netlist. In this embodiment, the properties of the post-fit netlist, such as the synthesis, placement, and routing of the pre-compiled logic is preserved. The timing characteristics of the placed and routed pre-compiled logic is also preserved. This may be achieved for example by using back annotation and/or explicit location/routing constraints. This may also be achieved by using incremental compilation. By preserving the timing characteristics of the placed and routed pre-compiled logic, only configurable clocks driving kernel logic need to be analyzed and configured/modified.

At 370, an assembly procedure is performed. The assembly procedure involves creating a program file that includes information determined by the procedures described at 310, 320, 330, 340, 350, 350, and possibly 360. The program file may be a bit stream that may be used to program a target device. According to an embodiment of the present invention, the procedures illustrated in FIG. 3 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. The target device may be programmed with the data file. By programming the target with the data file, components on the target device are physically transformed to implement the system.

Figure 4:
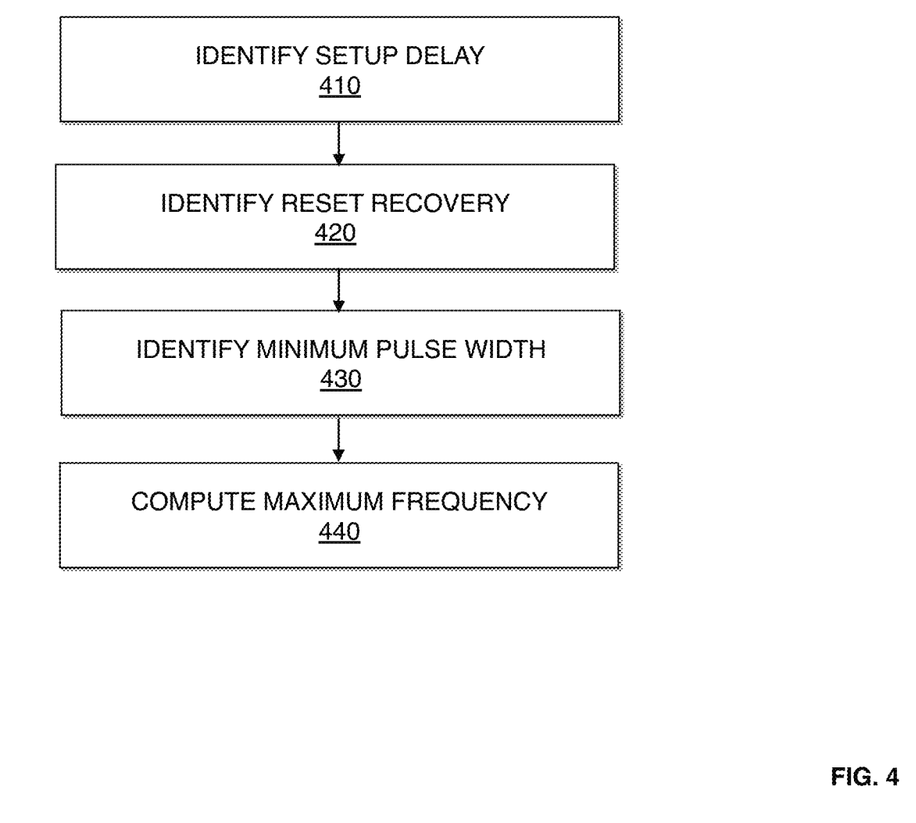
FIG. 4 is a flow chart illustrating a method for computing the maximum frequency of kernel logic according to an embodiment of the present invention.

FIG. 4 is a flow chart illustrating a method for computing the maximum frequency of kernel logic according to an embodiment of the present invention. The kernel logic is a section of the system implemented on the target device. According to an embodiment of the present invention, the procedures illustrated in FIG. 4 may be used to implement procedure 340 in part (shown in FIG. 3). The procedure in FIG. 4 may be performed to determine the maximum frequency for each section of a system to be implemented on a target device. Each of the sections may correspond to its own clock domain and associated with a configurable clock. At 410, setup delay is identified for signal paths in the section. According to an embodiment of the present invention, setup delay is the time required before a clock's active edge that data must be stable for it to be latched correctly.

At 420, reset recovery time is identified for signal paths in the section. According to an embodiment of the present invention, reset recovery time is the time between when reset is asserted and de-asserted and the time where the registers in the section return to the same clock cycle.

At 430, minimum pulse width is identified for the section. The minimum pulse width assures that the period and duty cycle of each signal in the section satisfies the constraints of the physical hardware in the section.

At 440, the maximum frequency for which a clock may drive the section is determined from the setup delay, reset recovery, and pulse width analysis performed at 410, 420, and 430. According to an embodiment of the present invention, clock derivatives are accounted for when determining the maximum frequency. For example a normal clock and a clock operating at twice its rate may be assigned to each section, and an analysis may be performed between the two related clock domains.

Figure 5:
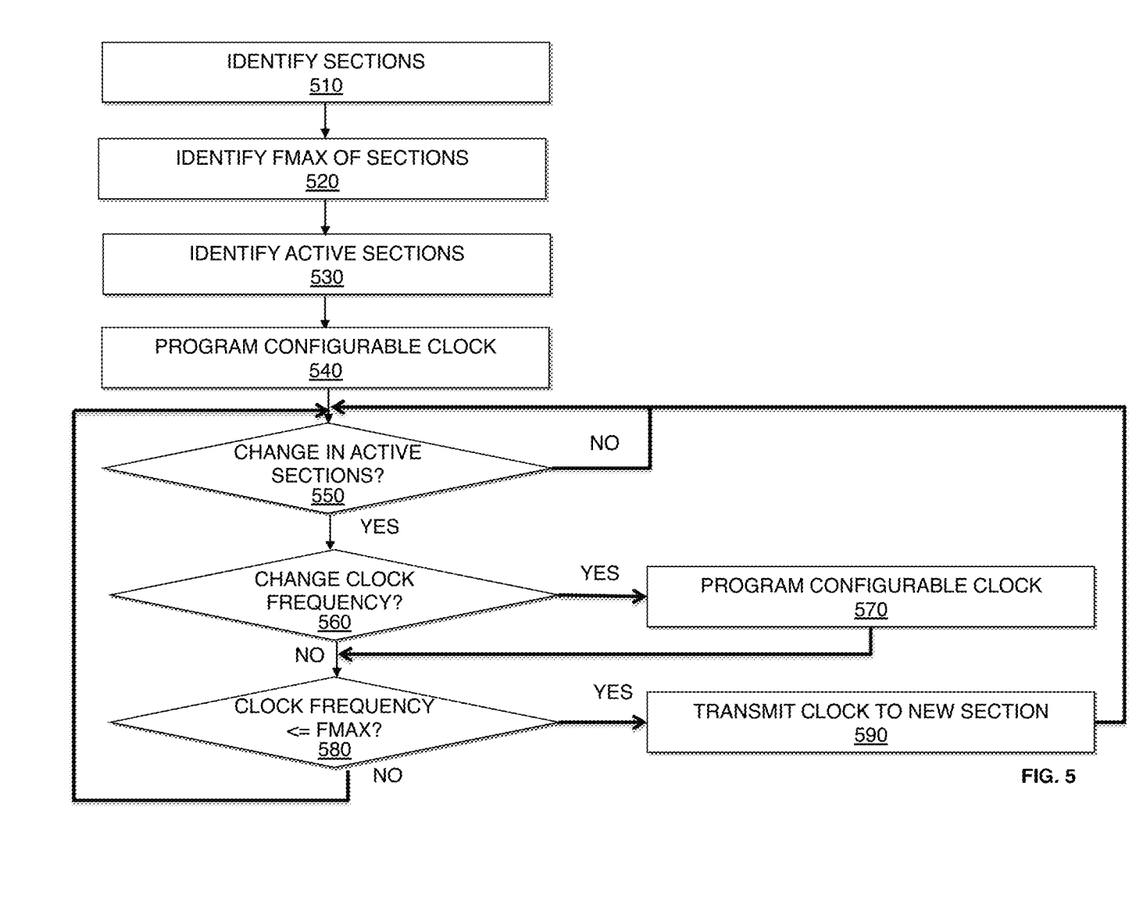
FIG. 5 is a flow chart illustrating a method for scheduling a configurable clock according to an embodiment of the present invention.

FIG. 5 is a flow chart illustrating a method for scheduling a configurable clock according to an embodiment of the present invention. When several sections, implemented by kernel logic, are implemented in a system, but only a subset of the sections are active at a time, a single configurable clock may be implemented to support the several sections. The configurable clock may be programmed such that it runs at a frequency that is functional only for the active sections. At 510, sections associated with a configurable clock are identified. According to an embodiment of the present invention, the sections associated with the configurable clock are sections with logic that are assigned to be driven by the configurable clock.

At 520, the maximum frequency for which each of the sections may be driven by the configurable clock is identified. According to an embodiment of the present invention, the maximum frequency may be identified by the procedure described at FIG. 4.

At 530, sections which are active are identified. According to an embodiment of the present invention, an active section is a section on the target device that should be running at the present instant of time.

At 540, the configurable clock is programmed. According to an embodiment of the present invention, the configurable clock is programmed to operate at a lowest maximum frequency associated with the active sections identified. The signal from the configurable clock is transmitted to each of the active sections.

At 550, it is determined whether there is a change in the identity of active sections. The identity of active sections change when one or more previous active sections become inactive or one or more previous inactive sections become active. According to an embodiment of the present invention, the identification of the active sections at 530 occurs at a first instant of time and the determination of whether there is a change in the identity of active sections occurs at a second instant of time. If there is a change in the active sections, control proceeds to 560. If there is no change in the active sections, control returns to 550.

At 560, it is determined whether the frequency of the configurable clock should be changed. According to an embodiment of the present invention, the frequency of the configurable clock should change when a previous active section with the lowest maximum frequency becomes inactive, and a new lowest maximum frequency is applicable. If the frequency of the configurable clock should be changed, control proceeds to 570. If the frequency of the configurable clock should not be changed, control proceeds to 580.

At 570, the configurable clock is changed to the new lowest maximum frequency. It should be appreciated that the new lowest maximum frequency may be either higher or lower than the previous lowest maximum frequency.

At 580, it is determined whether the frequency of the configurable clock is less than or equal to a new active section. If the frequency of the configurable clock is less than or equal to the new active section, control proceeds to 590. If the frequency of the configurable clock is not less than or equal to the new active section, control returns to 550.

At 590, the signal from the configurable clock is transmitted to the new section.

Figure 6:
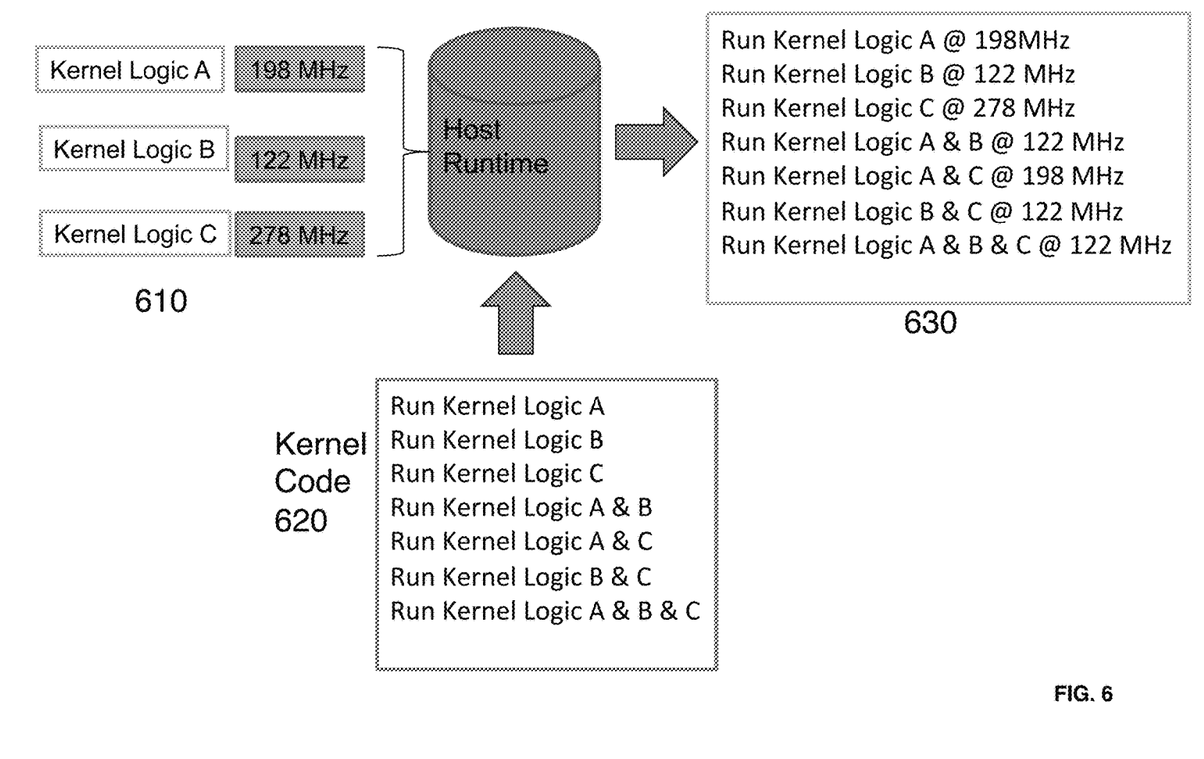
FIG. 6 illustrates an example of how a configurable clock is scheduled.

FIG. 6 illustrates an example of how a configurable clock is scheduled based on the maximum frequency of sections assigned to the configurable clock that are implemented by kernel logic. As shown at 610, three sections of a system have three different maximum frequency requirements. As shown at 620, kernel code describing the operation of the system identifies possible active states of the sections. As shown at 630, the configurable clock is programmed to support the active sections by operating at the lowest maximum frequency associated with the active sections.

An alternative to leveraging a single configurable clock to drive a plurality of clock domains is to assign a configurable clock to each clock domain. This would allow kernel logic in each clock domain to operate at its maximum frequency and not be limited to the maximum frequency of another kernel logic sharing the same configurable clock. Furthermore, kernel logic residing in different clock domains may be executed simultaneously. According to an embodiment of the present invention, a system designer implemented by the EDA tool may analyze the kernel logic of a system and determine when to assign a configurable clock to a single clock domain (single kernel logic) and when to assign a configurable clock to be shared by a plurality of clock domains (a plurality of kernel logic). The system designer may make this determination in response to the kernel logic's maximum frequency, duration of execution, and amount of overlap for each kernel logic. The system designer may implement an assignment that minimizes a number of clock domains and maximizes throughput.

FIGS. 1-5 are flow charts that illustrate embodiments of the present invention. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 7:
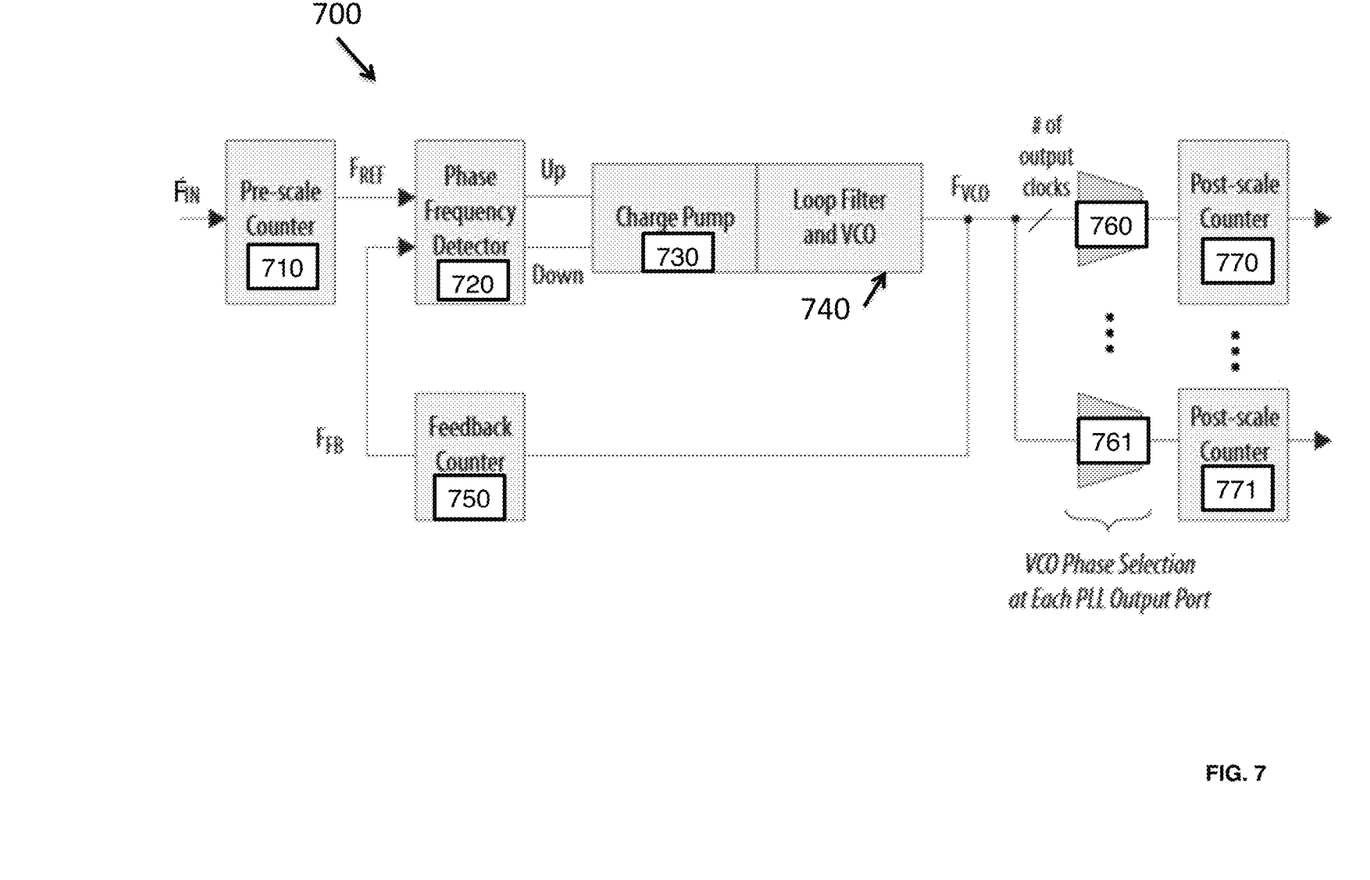
FIG. 7 is a block diagram of a configurable clock according to an embodiment of the present invention.

FIG. 7 is a block diagram of a configurable clock 700 according to an embodiment of the present invention. The configurable clock 700 includes a pre-scale counter 710, a phase frequency detector 720, a charge pump 730, a loop filter and voltage controlled oscillator 740, a feedback counter 750, phase selection units 760-761, and post-scale counters 770-771. According to an embodiment of the present invention, the configurable clock 700 may be programmed by modifying one or more configuration bits. For example, a configuration bit N may be applied to feedback counter 750 to divide an incoming clock signal. A configuration bit M may be applied to the pre-scale counter 710 to divide a clock on a feedback path having an overall effect of multiplying an incoming clock. A configuration bit Ci may be applied to pre-scale counters 770-771 to divide an output of the configurable clock 700. In one embodiment the output frequency of the configurable clock has the following relationship.

$$\text{Output Frequency} = M/(N*Ci)*\text{Input Frequency}$$

It should be appreciated that other configuration bits may be defined and applied to program the frequency of the configurable clock 700.

Figure 8:
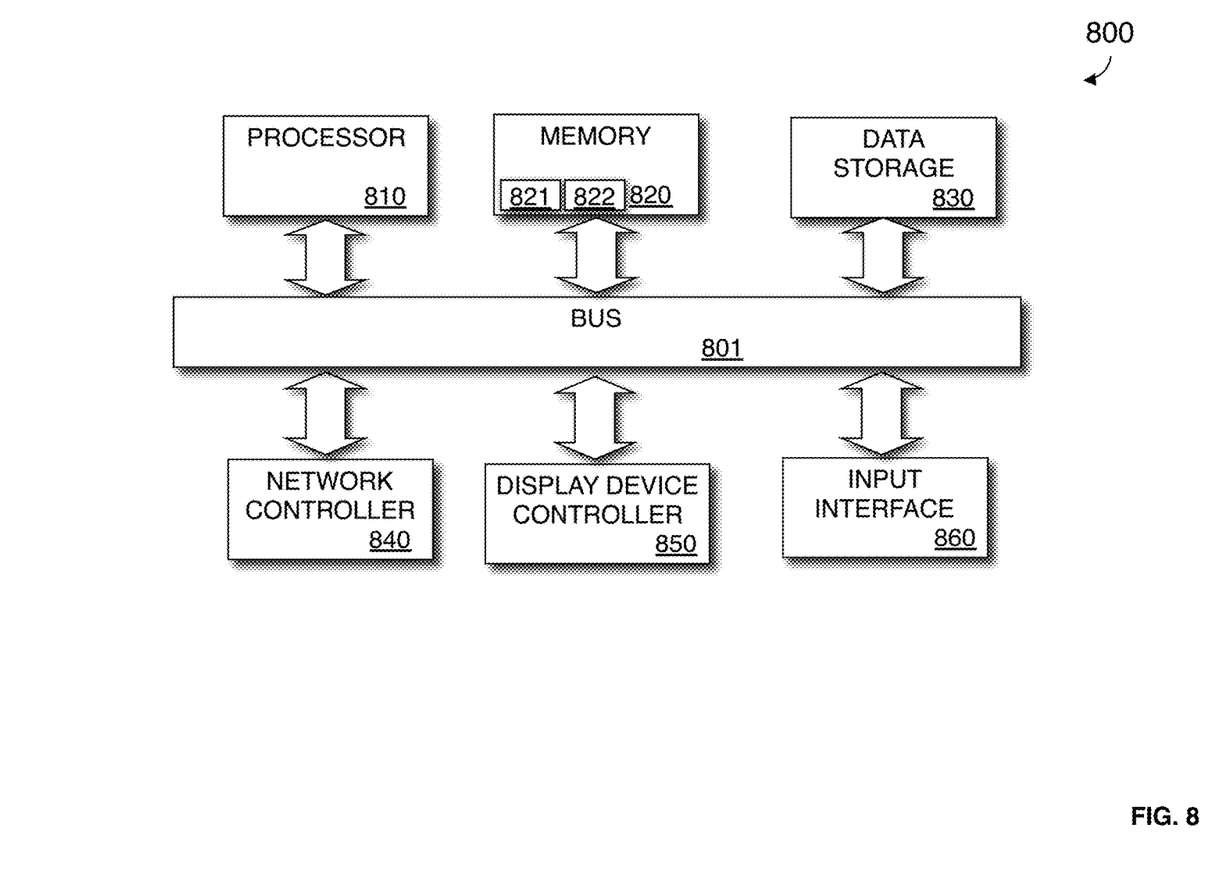
FIG. 8 is a block diagram of a computer system implementing a system designer according to an embodiment of the present invention.

FIG. 8 is a block diagram of an exemplary computer system 800 in which an example embodiment of the present invention resides. The computer system 800 includes a processor 810 that process data signals. The processor 810 is coupled to a bus 801 or other switch fabric that transmits data signals between processor 810 and other components in the computer system 800. The computer system 800 includes a memory 820. The memory 820 may store instructions and code represented by data signals that may be executed by the processor 810. A data storage device 830 is also coupled to the bus 801

A network controller 840 is coupled to the bus 801. The network controller 840 may link the computer system 800 to a network of computers (not shown) and supports communication among the machines. A display device controller 850 is coupled to the bus 801. The display device controller 850 allows coupling of a display device (not shown) to the computer system 800 and acts as an interface between the display device and the computer system 800. An input interface 860 is coupled to the bus 801. The input interface 860 allows coupling of an input device (not shown) to the computer system 800 and transmits data signals from the input device to the computer system 800.

A system designer 821 may reside in the memory 820 and be executed by the processor 810. The system designer 821 may operate to perform high-level compilation, HDL compilation, program a target device, and program a configurable clock in the target device in response to a maximum frequency identified for a section of a system on the target device. According to an embodiment of the present invention, the system designer 821 may implement the procedures described with reference to FIGS. 1-4. A configurable clock scheduler 822 may reside in the memory 820 and be executed by the processor 810. The configurable clock scheduler 822 may operate to schedule the frequency in which the configurable clock operates and to determine which active sections in the system to transmit a clock signal to. According to an embodiment of the present invention, the configurable clock scheduler 822 may implement the procedures described with reference to FIG. 5.

Figure 9:
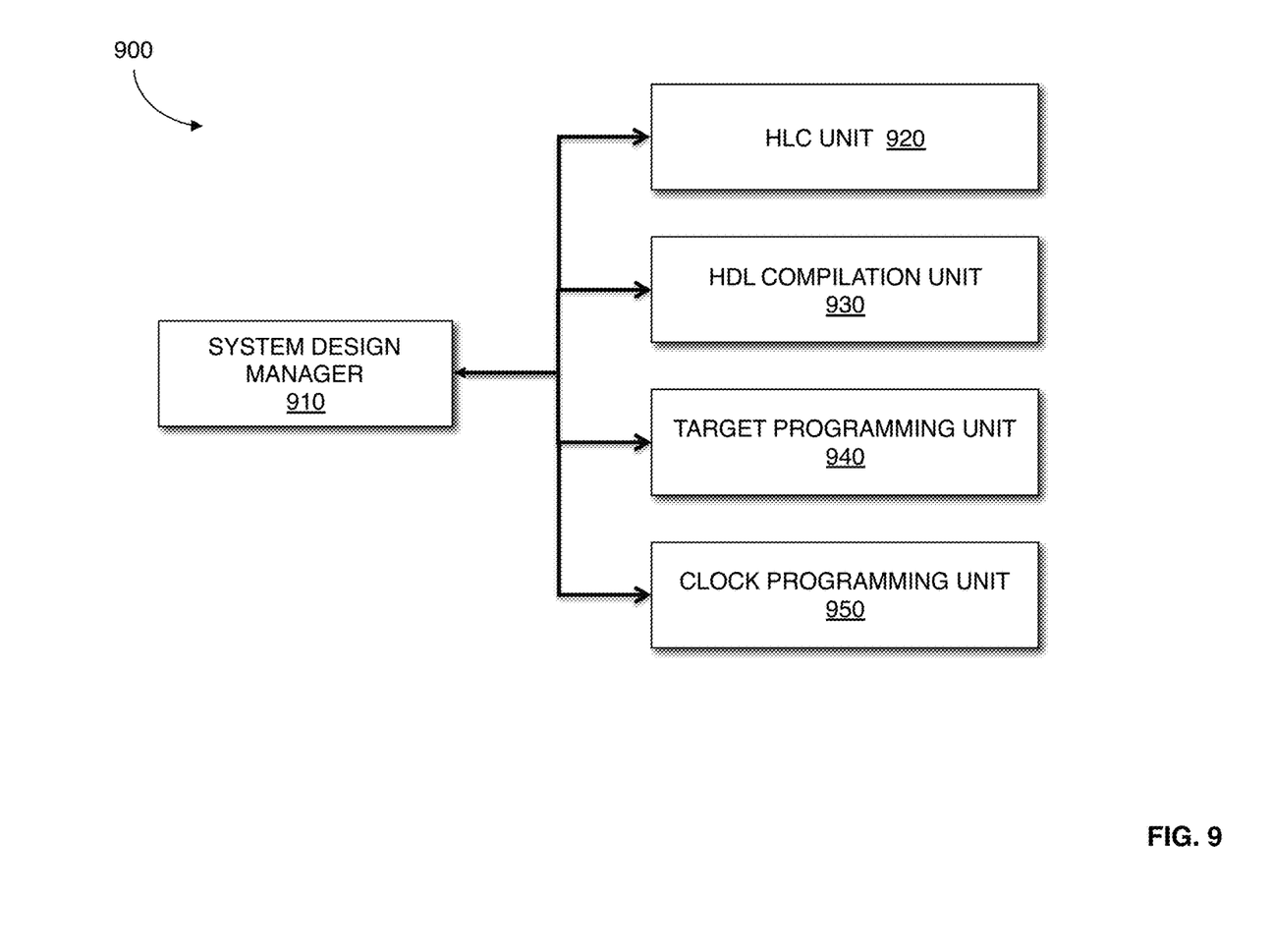
FIG. 9 is a block diagram of a system designer according to an embodiment of the present invention.

FIG. 9 illustrates a system designer 900 according to an embodiment of the present invention. The system designer 900 may be an EDA tool for designing a system on a target device such as an FPGA, structured application-specific integrated circuit (ASIC), ASIC, or other circuitry. FIG. 9 illustrates modules implementing an embodiment of the system designer 900. According to one embodiment, the modules represent software modules and system design may be performed by a computer system such as the one illustrated in FIG. 8 executing sequences of instructions represented by the modules shown in FIG. 9. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 900 includes a designer manager 910. The designer manager 910 is connected to and transmits data between the components of the system designer 900.

The system designer 900 includes a high-level compilation (HLC) unit 920. The high-level compilation unit 920 generates an HDL of a system from a computer language description of the system. The HDL of the system may integrate information regarding other components or hosts that may be pre-designed. According to an embodiment of the present invention, the HDL of the system includes one or more configurable clocks that may have its operating frequency programmed during HDL compilation or after the system is programmed on a target device. The configurable clock may be inserted into the computer language description of the system by a designer, in response to requirements in the information regarding other components or hosts, or automatically in response to identifying a need for a clock. According to an embodiment of the present invention, the high-level compilation unit 920 may perform procedures described with reference to FIGS. 1 and 2.

The system designer 900 includes a hardware description language (HDL) compilation unit 930. The hardware description language compilation unit 930 performs synthesis, placement, routing, and timing analysis on the HDL and generates a program file. According to an embodiment of the present invention, maximum frequencies of sections of the system are identified from timing analysis, and configurable clocks associated with the sections of the system are programmed in response to the maximum frequencies during HDL compilation. According to an embodiment of the present invention, the hardware description language compilation unit 930 may perform procedures described with reference to FIGS. 3 and 4.

The system designer 900 includes a target device programming unit 940. The target device programming unit 940 programs the target device using the program file to implement the system. By programming the target with the program file, components on the target device are physically transformed to implement the system.

The system designer 900 includes a clock programming unit 950. The clock programming unit 950 programs one or more configurable clocks. According to an embodiment of the present invention, the maximum frequencies of sections of the design for the system are identified from timing analysis and configurable clocks associated with the sections of the design are programmed in response to the maximum frequencies after the target device has been programmed. According to an embodiment of the present invention, programming the configurable clocks may be achieved by using a control/host processor connected to the target device or a state machine residing on the target device. The control/host processor may be connected to the target device and transmit clock configuration instruction to the target device using a bus standard such as PCI express.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 10:
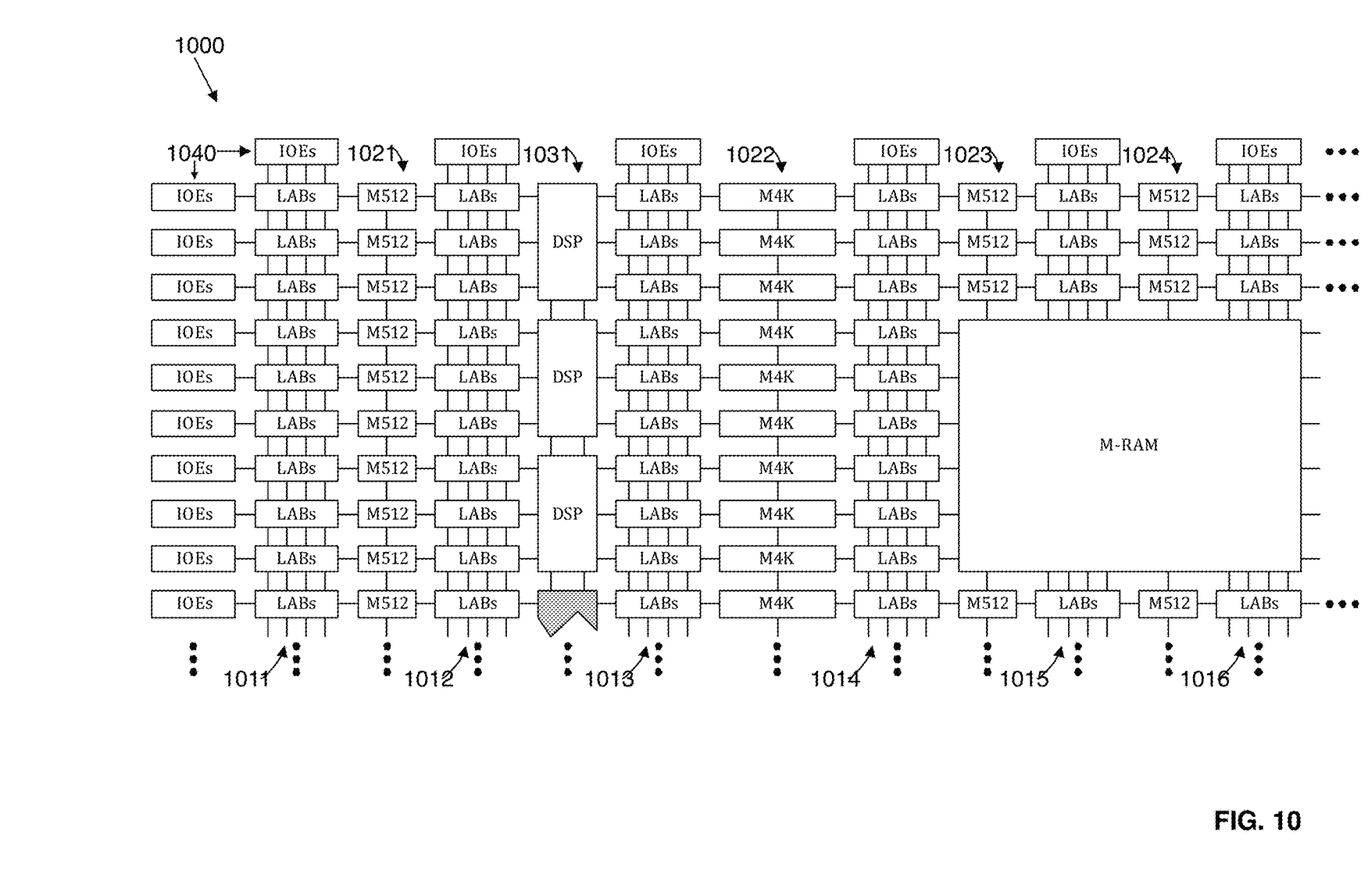
FIG. 10 illustrates an exemplary target device according to an embodiment of the present invention.

FIG. 10 illustrates a device 1000 that may be used to implement a target device according to an embodiment of the present invention. The device 1000 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB)

such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 1000. Columns of LABs are shown as 1011-1016. It should be appreciated that the logic block may include additional or alternate components.

The device 1000 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1000. Columns of memory blocks are shown as 1021-1024.

The device 1000 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1000 and are shown as 1031.

The device 1000 includes a plurality of input/output elements (IOEs) 1040. Each IOE feeds an IO pin (not shown) on the device 1000. The IOEs 1040 are located at the end of LAB rows and columns around the periphery of the device 1000. Each IOE may include a bidirectional IO buffer and a plurality of registers for registering input, output, and output-enable signals.

The device 1000 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a system on a target device, comprising:
   describing the system in a high-level synthesis language where the system includes a configurable clock to drive the system at a specified clock frequency;
   generating a hardware description language (HDL) of the system from the high-level synthesis language;
   performing initial compilation of the HDL of the system in response to the specified clock frequency;
   performing timing analysis on the system after the initial compilation of the HDL to determine a maximum frequency which the system can be driven;
   programming the configurable clock to drive the system at the maximum frequency;
   identifying kernels to be driven by the configurable clock;
   performing timing analysis to determine a maximum frequency for which each of the identified kernels can be driven;
   identifying which of the identified kernels are active on the target device at an instant of time; and
   programming the configurable clock to operate at a clock frequency which is a lowest maximum frequency of the active kernels.

2. The method of claim 1, wherein the high-level synthesis language is generated in response to source code provided by a user which specifies the configurable clock.

3. The method of claim 1, wherein the high-level synthesis language is generated in response to a pre-defined platform definition that includes a compiled netlist which specifies the configurable clock.

4. The method of claim 1, wherein the configurable clock is added automatically when a clock is needed by the system when generating the high-level synthesis language.

5. The method of claim 1, wherein performing initial compilation comprises performing synthesis, placement, and routing.

6. The method of claim 1, wherein programming the configurable clock comprises modifying configuration bits of the target device.

7. The method of claim 1, wherein programming the configurable clock comprises repeating synthesis, placement, and routing.

8. The method of claim 1 further comprising programming the compiled HDL on the target device.

9. The method of claim 8, wherein the configurable clock is programmed after the compiled HDL is programmed onto the target device by a control processor.

10. The method of claim 1, wherein the maximum frequency is higher than the specified clock frequency.

11. The method of claim 1, wherein the maximum frequency is lower than the specified clock frequency.

12. The method of claim 1 further comprising:
   identifying which of the identified kernels are active on the target device at a second instant of time;
   transmitting a clock signal from the configurable clock to an identified active kernel at the second instant of time if the configurable clock is operating at a frequency that is equal to or less than a maximum frequency which the identified active kernel can be driven.

13. The method of claim 1 further comprising:
   identifying which of the identified kernels are active on the target device at a second instant of time; and
   programming the configurable clock to operate at a clock frequency of an identified active kernel at the second instant of time after an identified active kernel at the instant of time is inactive if the configurable clock is operating at a frequency that is greater than a maximum frequency which the identified active kernel can be driven.

14. The method of claim 13, wherein the configurable clock is programmed after the compiled HDL is programmed onto the target device by a control processor.

15. The method of claim 1 further comprising programming compiled HDL of the kernels on the target device.

16. A system designer, comprising:
   a high-level compilation unit that generates a description of a system in a hardware description language (HDL) where the system includes a configurable clock to drive the system at a specified clock frequency;
   a HDL compilation unit that performs an initial compilation of the HDL of the system in response to the specified clock frequency, that performs timing analysis on the system after the initial compilation of the HDL to determine a maximum frequency which the system can be driven; and
   a clock programming unit that programs the configurable clock to drive the system at the maximum frequency, identifies kernels to be driven by the configurable clock, performs timing analysis to determine a maximum frequency for which each of the identified kernels can be driven, identifies which of the identified kernels are active on the target device at an instant of time, and programs the configurable clock to operate at a clock frequency which is a lowest maximum frequency of the active kernels, wherein at least one of the high-level compilation unit, HDL compilation unit, and clock programming unit is implemented by hardware.

17. The system designer of claim 16 further comprising a clock programming unit that further programs the configurable clock after the system is programmed on a target device.

18. The system designer of claim 16, wherein the configurable clock is added by the high-level compilation unit when a pre-defined platform definition, that includes a compiled netlist, specifies a requirement for the configurable clock.

19. The system designer of claim 16, wherein the configurable clock is added by the high-level compilation unit when source code provided by a user specifies a requirement for the configurable clock.

20. The system designer of claim 16, wherein the configurable clock is added by the high-level compilation unit when a clock is required by the system.

21. A non-transitory computer readable medium including a sequence of instructions stored thereon for causing a computer to execute a method for designing a system on a target device, comprising:
   describing the system in a high-level synthesis language where the system includes a configurable clock to drive the system at a specified clock frequency;
   generating a hardware description language (HDL) of the system from the high-level synthesis language;
   performing initial compilation of the HDL of the system in response to the specified clock frequency;
   performing timing analysis on the system after the initial compilation of the HDL to determine a maximum frequency which the system can be driven;
   programming the configurable clock to drive the system at the maximum frequency;
   identifying kernels to be driven by the configurable clock;
   performing timing analysis to determine a maximum frequency for which each of the identified kernels can be driven;
   identifying which of the identified kernels are active on the target device at an instant of time; and
   programming the configurable clock to operate at a clock frequency which is a lowest maximum frequency of the active kernels.

* * * * *